United States Patent [19]
Eaton et al.

[11] Patent Number: 5,282,105
[45] Date of Patent: Jan. 25, 1994

[54] COMPOUND RADIUS GUIDE POST

[75] Inventors: James H. Eaton, Morgan Hill; Jaquelin K. Spong, Mountain View, both of Calif.; Johnny L. Teale, Tucson, Ariz.

[73] Assignee: International Business Machines Corporation, Armonk, N.Y.

[21] Appl. No.: 29,284

[22] Filed: Mar. 8, 1993

Related U.S. Application Data

[63] Continuation of Ser. No. 714,952, Jun. 13, 1991, abandoned.

[51] Int. Cl.⁵ .............................................. G11B 15/60
[52] U.S. Cl. ........................................... 360/130.21
[58] Field of Search ................ 360/93, 130.21–130.24; 242/197–200; 226/196–199

[56] References Cited

U.S. PATENT DOCUMENTS

| | | |
|---|---|---|
| 2,095,733 | 10/1937 | Coryell . |
| 3,114,150 | 12/1963 | Calano .............................. 226/197 X |
| 3,132,788 | 5/1964 | Johnson . |
| 3,156,398 | 11/1964 | Lauxen et al. . |
| 3,185,365 | 5/1965 | Rayfield et al. . |
| 3,276,651 | 10/1966 | Bryer . |
| 3,310,214 | 3/1967 | Nesin . |
| 3,327,964 | 6/1967 | Nussbaumer . |
| 3,360,174 | 12/1967 | Evert . |
| 3,393,849 | 7/1968 | Hass . |
| 3,756,610 | 9/1973 | Naegele .......................... 360/130.21 |
| 3,888,429 | 6/1975 | Mack ............................... 226/196 X |
| 3,991,956 | 11/1976 | Machida .............................. 242/199 |
| 4,071,177 | 1/1978 | Burdorf ................................. 226/7 |
| 4,084,683 | 4/1978 | Moss ................................. 197/170 |
| 4,144,991 | 3/1979 | Eddy ................................. 226/195 |
| 4,276,575 | 6/1981 | Schoettle et al. ................. 360/130.1 |
| 4,334,656 | 6/1982 | Crawford ........................... 242/195 |
| 4,335,857 | 6/1982 | Fost et al. .......................... 242/192 |
| 4,341,335 | 7/1982 | Schmid .............................. 226/195 |
| 4,389,600 | 6/1983 | Milligan ................................ 318/6 |
| 4,406,425 | 9/1983 | Bullock et al. ...................... 242/183 |
| 4,467,411 | 8/1984 | Fry et al. ............................ 364/200 |
| 4,479,158 | 10/1984 | Froehlich et al. ................ 360/130.1 |
| 4,633,347 | 12/1986 | Higgins ................................ 360/90 |
| 4,685,005 | 8/1987 | Fields ................................. 360/53 |
| 4,913,328 | 4/1990 | Schulz ................................ 226/21 |

FOREIGN PATENT DOCUMENTS

| | | |
|---|---|---|
| 0217157 | 9/1986 | European Pat. Off. ... G11B 23/087 |
| 2224830 | 10/1974 | France . |
| 1002180 | 10/1962 | United Kingdom . |
| 1165696 | 10/1965 | United Kingdom . |

OTHER PUBLICATIONS

IBM TDB Oct. 1986 pp. 2126–2127 Compliant Guide Assembly with High Wear Resistance Contact Pads.
IBM J of R&D Nov. 1974 pp. 513–520 Dynamic Response of Self-Acting Foil Bearings.
Fluid Film Lubrication Article W. A. Gross, et al. 1980.
JAP Aricle, Feb. 1987 pp. 1646–1648 Reduction of Friction between a tape and a smooth surface by acoustic excitation.

Primary Examiner—A. J. Heinz
Attorney, Agent, or Firm—M. W. Schecter

[57] ABSTRACT

The invention is a tape guiding post including a tape engaging surface having a longitudinal contour with a compound radius of curvature. In the preferred embodiment, the longitudinal contour has a smoothly varying radius of curvature. The outer portions of the contour have a relatively large radius of curvature and blend smoothly into a central portion which is of a relatively small radius of curvature to allow for any desired bending of the tape in its easy direction. The combination minimizes both friction and stiction between the tape and the guide. The guide is also laterally contoured to accommodate droop at the edges of the tape, caused by low air pressure at the edges.

25 Claims, 1 Drawing Sheet

COMPOUND RADIUS GUIDE POST

This is a continuation of U.S. application 07/714,952, filed Jun. 13, 1991, now abandoned.

BACKGROUND OF THE INVENTION

1. Field of the Invention

This invention relates to a post for guiding tape in a magnetic tape drive. More particularly, the invention is a guide post including a tape engaging surface having a longitudinal contour with a compound radius of curvature.

2. Description of the Related Art

Web and tape guiding apparatus are well known. Perhaps the most common use of such an apparatus is for guiding tapes in magnetic tape drives over a magnetic read/write head. Guiding of the tape over the head is critical to the writing of data to and the reading of data from the magnetic tape. A typical magnetic tape drive includes several elements in the tape path to ensure proper alignment and operation of the tape and head. For example, the tape path of the IBM 3480/3490 tape drives includes a supply reel inside a tape cartridge, a vibration decoupler, a cleaner blade, an arcuate supply side air bearing device, a magnetic read/write head, an arcuate storage side air bearing device, a tension transducer, a storage reel, and tape edge guides along the sides of the bearing surfaces. The tape edge guides are located along the arcuate bearing surfaces because the tape in such proximity can support a larger guiding force without collapsing than can a freely suspended tape. The tape edge guides physically align the lateral position (i.e. in the direction of the tape width) of the tape relative to the read/write head. Lateral positioning maintains proper alignment between the read/write elements of the head and the data tracks on the magnetic tape. The tape guides also support and guide the tape in its easy direction of bending (i.e. in the direction of tape travel).

Three basic types of guides are known for easy direction tape guiding. The first such guide is a fixed cylindrical post. The use of this type of guide is based on the theory that a hydrodynamic film of air forms between the tape and the post when the tape is in motion, thereby reducing friction and wear. However, practically sized posts fail to produce an air film of sufficient thickness to reduce friction and wear to a significant extent. Also, when the tape is stopped and rests on the post under tension it sticks to the post. Such "stiction" makes the initiation of tape movement difficult and may result in damage to the tape.

Another type of easy direction tape guide is a roller. As compared to posts, rollers reduce friction with a tape in motion and stiction with a tape at rest. However, rollers introduce another source of vibration into the tape path (which may disrupt the head-tape interface). Also, rollers store energy that must be positively controlled to maintain adequate closed loop tension control. Finally, rollers steer tape differently than do posts, and often require grooves or other geometries to prevent the tape from flying over them.

The third type of easy direction tape guide is an externally pressurized air bearing. Although an air bearing can dramatically reduce tape friction and stiction, it is more complex and expensive than a post or a roller. An air bearing is complex because it requires the space and parts for air to be provided under controlled pressure. An air bearing is expensive because of such complexity, and because a source of compressed air must be provided. Finally, more than one type of easy direction guide can be used in a tape path to form a variety of tape path configurations.

Examples of fixed cylindrical posts and/or rollers are disclosed in U.S. Pat. Nos. 4,341,335, 3,360,174 3,276,651, 3,327,964, 4,144,991, 4,633,347, and 3,991,956. To the extent that these references disclose the guiding of flexible webs, the posts and/or rollers are used to drive web movement, control web tension, or provide lateral web guiding. In addition, U.S. Pat. Nos. 2,095,733, 4,335,857, 3,393,849, 3,132,788, 4,913,328, and 4,084,683 disclose rollers having a lateral contour designed to guide a web laterally. Air bearings are disclosed in U.S. Pat. No. 4,071,177, Garcia et al, Compliant Guide Assembly with High Wear Resistance Contact Pads, IBM Technical Disclosure Bulletin, Vol 29, No. Oct. 5, 1986, pp. 2126–27, and in the IBM 3480/3490 tape drives. Also, U.S. Pat. No. 4,276,575 discloses the use of a plastic lubricant on a tape guide to reduce friction. However, for the aforementioned reasons, these references fail to achieve a simple, low cost, low friction/stiction tape guide which accommodates changes in tape direction (i.e. easy direction bending).

SUMMARY OF THE INVENTION

In view of the foregoing, it is the principal object of this invention to improve easy direction tape guides.

Another object of this invention is the reduction of friction and/or stiction in easy direction tape guides.

Still another object of this invention is to accomplish the aforementioned objects at a minimum of additional expense and complexity, yet accommodating changes in tape direction.

These and other objects of this invention are accomplished by a guide post including a tape engaging surface having a longitudinal contour with a compound radius of curvature. In the preferred embodiment, the longitudinal contour has a smoothly varying radius of curvature. The outer portions of the contour have a relatively large radius of curvature and blend smoothly into a central portion which is of a relatively small radius of curvature to allow for any desired bending of the tape in its easy direction. The combination minimizes both friction and stiction between the tape and the guide. The guide is also laterally contoured to accommodate droop at the edges of the tape, caused by low air pressure at the edges.

The foregoing and other objects, features, and advantages of the invention will be apparent from the following more particular description of the preferred embodiment of the invention, as illustrated in the accompanying drawing.

BRIEF DESCRIPTION OF THE DRAWING

FIG. 2b is an alternative embodiment to FIG. 2a.

DESCRIPTION OF THE PREFERRED EMBODIMENT

Figure 1:
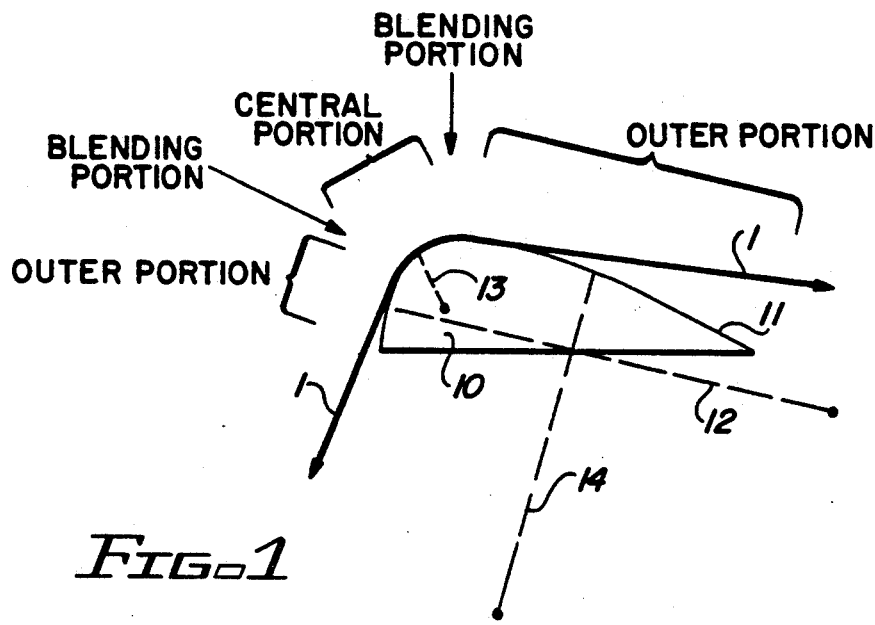
FIG. 1 is a side view of the tape guide of the invention.

Referring now more particularly to the drawing, like numerals denote like features and structural elements in the various figures. The tape guide of the invention will be described as embodied in a magnetic tape drive. Referring to FIG. 1, a magnetic tape 1 is shown bent in its easy direction around, and in close proximity to, a tape guide 10. Guide 10 is a fixed post including a tape engaging surface 11. Tape 1 may travel in either direction depicted by the arrows at either end thereof in FIG. 1.

It is known that the hydrodynamic film of air which separates a tape from a tape engaging surface is largely determined by the curvature at the entrance to the tape engaging surface, and is thereafter relatively constant along its length. The entrance to a guide is the portion of the guide which is first approached by a tape as it moves past the guide. For example, if tape 1 is moving from the lower left to the extreme right of FIG. 1, the entrance to guide 10 is at the lower left portion of tape engaging surface 11. For a cylinder of radius R, the thickness t of the uniform air film is given approximately by:

$$t = 0.643 R (6 \mu U/T)^{\frac{1}{3}} \quad (1)$$

where $\mu$ is the viscosity of air, U is the tape velocity, and T is the tape tension per unit width. For further description of equation 1, see Gross et al, Fluid Film Lubrication, John Wiley and Sons, Inc., N.Y., 1980, p. 493, hereby incorporated by reference. As used herein, a tape and a guide are in "close proximity" when they are at least close enough to apply equation 1.

In view of equation 1, it is therefore known that the air film between a tape and a guide can be made very large by increasing R. It is also known that a thick air film can reduce contact between a tape and a guide, thereby reducing friction. Thus, a simple cylindrical guide with a very large radius of curvature would achieve a thick air film and low friction. However, at least three other factors must be considered. First, a large radius of curvature is incompatible with the trend towards small form factor tape drives. Second, if the tape is laterally guided by exerting force on its edges, a small radius of curvature is required to prevent the tape from buckling. Third, when there is no tape motion the tape will rest against the guide. The larger the radius of curvature the more contact there will be between the tape and the tape engaging surface, resulting in increased stiction.

Referring again to FIG. 1, friction and stiction are minimized by tape engaging surface 11 having a longitudinal contour (i.e. along the direction of tape movement) with a compound radius of curvature. In the preferred embodiment shown, the longitudinal contour includes five adjacent portions. Two outer portions have relatively large radii of curvature 12 and 14, and therefore establish a thick air film that will lubricate the other portions. The central portion is of a relatively small radius of curvature 13 to allow for any desired bending of the tape in its easy direction. The outer portions minimize friction by guaranteeing that the separation between tape 1 and guide 10 is significantly greater than their respective RMS surface roughness. The central portion minimizes stiction and allows for easy direction bending.

Two blending portions join the outer portions with the central portion by providing a smooth transition between the distinct radii. The blending portions minimize adverse effects of tape stiffness by ensuring a continuous second derivative along the contour. This also aids in maintaining the large air film through the central portion. There are a variety of ways to accomplish the transition between the outer and central portions. They can be joined, for example, by an elliptical contour, or a contour whose radius of curvature changes smoothly as a function of distance along the bearing, or simply by a polishing process that removes the discontinuity between the curvatures. In the preferred embodiment, the blending portion is described by $$\frac{1}{R(s)} = ks^x + \frac{1}{R1}$$

where s is the distance along the contour, R(s) is the radius of curvature at any point along the contour, $R_1$ is the radius of curvature in the outer portion, $0.5 < X < 2$, and k is a constant.

Magnetic tape heads having a compound radius of contour are known, such as that disclosed in U.S. Pat. No. 4,479,158, but are designed to achieve a very low flying height of the tape (or actual contact of the tape with the head) to maintain the signal-to-noise ratio and are thus not designed as previously described. Such heads use outer portions of a small radius of curvature to achieve a very low flying height.

In the preferred embodiment, radius of curvature 12 is approximately the same as radius of curvature 14, to equally accommodate tape travel in both directions, and greater than radius of curvature 13. Preferably, radii of curvature 12 and 14 are at least 5 times greater than radius of curvature 13. A suitable guide has been manufactured with a radius of curvature 12 and 14 of approximately 20.0 mm and a radius of curvature 13 of approximately 3.2 mm for a tape approximately 8.0 mm wide and 12 microns thick. The outer portion of tape engaging surface 11 having radius of curvature 12 included an arc of approximately 15 degrees, the central portion of tape engaging surface 11 having radius of curvature 13 included an arc of approximately 60 degrees, and the outer portion of tape engaging surface 11 having radius of curvature 14 included an arc of approximately 50 degrees The entrance to guide 10 should always include an arc of at least 6 degrees to ensure that equation 1 applies. The blending portions were created using surface polishing. The optimal radii of curvature, arcs (i.e. length of each portion), and other dimensions of guide 10 depend upon the actual application of the guide. Thus, in alternative embodiments, the longitudinal contour of guide 10 may be changed to accommodate particular needs. For example, radius of curvature 12 may be different than radius of curvature 14 in applications in which the tape travels in a single direction only.

Friction is also reduced by proper lateral contouring of guide 10. It has been shown that enough air leaks from beneath the sides of a tape flying over a simple cylindrical post to produce a lateral tape contour such that the edges of the tape sag or curl. See, for example, Deckert et al, Dynamic Response of Self-acting Foil Bearings, IBM Journal of Research and Development, November, 1974, pp. 513–520, hereby incorporated by reference. Such sagging of the tape edges tends to increase the area of contact between the tape and the guide, thereby increasing friction. By designing the lateral contour of the tape engaging surface to match the lateral profile of the tape, such friction is minimized.

Figure 2A:
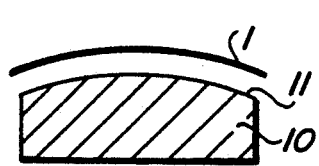
FIG. 2a is a front or rear view of FIG. 1.
Figure 2B:
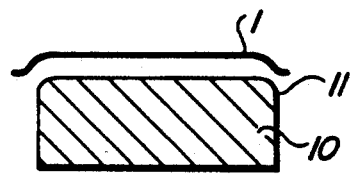

Referring to FIGS. 2a and 2b, a front or rear view of guide 10 (from the left side or right side respectively of FIG. 1) reveals the lateral profile of tape engaging surface 11. Tape 1 is shown only as it flies above guide 10, the portion of tape 1 which contacts the tape engaging surface or wraps about the portion of tape engaging surface having radius of curvature 12 is eliminated for convenience. Tape engaging surface 11 has a convex lateral contour which matches the lateral profile of tape 1. In FIG. 2a, the convex lateral contour is crowned, in FIG. 2b the width of guide 10 is reduced and the convex lateral contour is created by edge rounding. Suitable crowned guides have been manufactured with lateral radii of curvature of 300 mm to infinity for a tape approximately 8.0 mm wide and 12 microns thick. The optimum lateral contour for an application will vary depending upon the stiffness of the tape, longitudinal contour of the guide, and operating parameters of the application.

Figure 3:
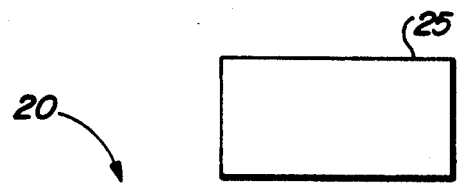
FIG. 3 is a schematic diagram of a magnetic tape drive according to the invention.
Figure 3:
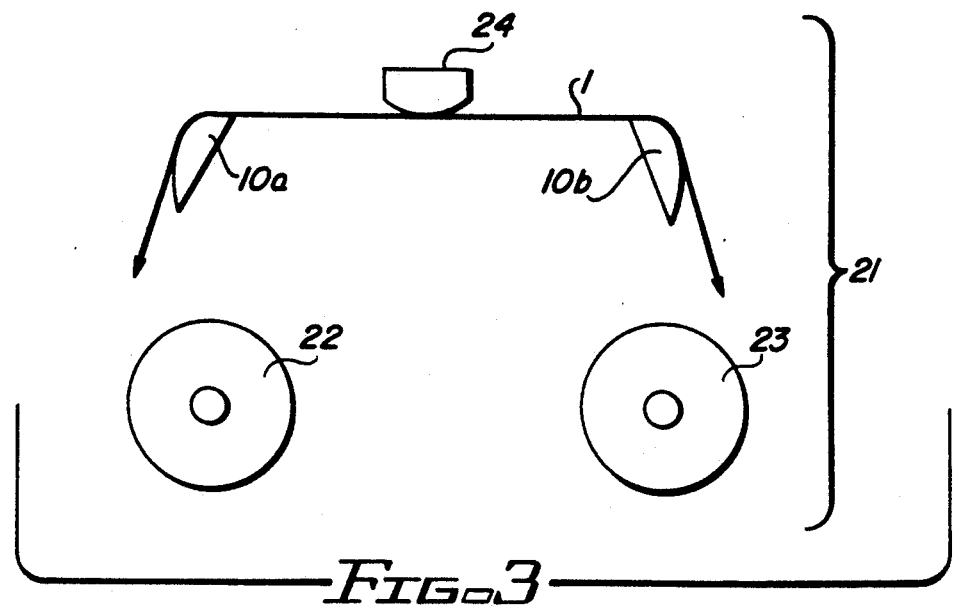

Referring to FIG. 3, a schematic diagram of a magnetic tape drive 20 is shown. Drive 20 includes a tape path 21, which is that portion of drive 20 in contact or close proximity with magnetic recording tape 1. Tape 1 may be any flexible magnetic recording tape; the composition of the tape is not relevant to the subject invention. A suitable tape is disclosed in U.S. Pat. No. 4,467,411, hereby incorporated by reference.

Tape 1 is wound at one end upon a first tape reel 22 and wound at the other end upon a second tape reel 23. Reels 22 and 23 are mechanically driven to rotate in either direction, as required to position the desired portion of tape 1 in close proximity adjacent to a magnetic tape head 24. Head 24 includes one or more magnetic transducers capable of magnetically writing data to and/or reading data from tape 1. The type of head is not relevant to the subject invention, a suitable head is disclosed in U.S. Pat. No. 4,685,005, hereby incorporated by reference.

Data (including analog or digitally encoded audio, visual or any computer related data) is recorded in one or more tracks on tape 1 using any available recording format. Two guides, 10a and 10b of the type shown in FIG. 1, maintain the position of tape 1. Guides 10a and 10b are positioned to maximize their utility. Because the amount of tape 1 wound upon a reel changes over time, the outer portion of the tape engaging surface of each guide closest to a reel must be able to accommodate a varying angle of tape approach (i.e. from a reel to a guide). The outer portion of the tape engaging surface of each guide which is closest to a reel is of greater arc than the outer portion closest to head 24, thereby preventing tape 1 from abrading against the pointed edge tip of a guide. Again, the optimal design of the guides will depend upon the characteristics of the application. The friction produced in tape path 21 can be tested for optimization by using a simple strain gauge. By mounting a guide on an axle, and coupling the axle to the strain gauge, the gauge monitors the tendency of the guide to rotate and hence the friction between the tape and the guide.

Many tape paths include the transducing head on the same side of the tape as the tape guides. In addition, one or both of the reels may be packaged into a tape cartridge. In the embodiment shown in FIG. 3, head 24 is on the opposite side of tape 1 from guides 10a and 10b, and reels 22 and 23 can be packaged into a single tape cartridge. Head 24 is not part of the cartridge, but is mounted in drive 20 and mated with tape 1 upon insertion of the cartridge. In another embodiment, head 24 is located on the same side of tape 1 as guides 10a and 10b and the tape cartridge only includes one of the reels. The other reel, head 24, and guides 10a and 10b are not part of the cartridge, but are mounted in drive 20. Upon insertion of the cartridge into drive 20, the end of tape 1 is removed from the cartridge reel and threaded through the tape path and onto to the reel in drive 20. A tape cartridge and threading apparatus suitable for such an embodiment is shown in U.S. Pat. No. 4,334,656, hereby incorporated by reference. If guides 10a and 10b are part of a tape cartridge, they are preferably molded of plastic to reduce weight and cost. If guides 10a and 10b are part of drive 20, they are preferably cast or machined of stainless steel or other wear resistant materials. In either case, the guides are simple in shape and therefore inexpensive to manufacture.

The operation of reels 22 and 23 and head 24 is managed by a controller 25 to controllably write data to and/or read data from tape 1. The electrical and mechanical connections to controller 25, the operation of controller 25, and additional components in path 21 are not relevant to the invention. Sample information is available in U.S. Pat. Nos. 4,467,411, 4,406,425, and 4,389,600, all of which are hereby incorporated by reference.

While the invention has been described with respect to a preferred embodiment thereof, it will be understood by those skilled in the art that various changes in detail may be made therein without departing from the spirit, scope, and teaching of the invention. For example, the guide described herein could be used for flexible web guiding applications other than magnetic tape drives. Such applications include optical tape drives and film and fabric winding. Also, a tape path could include any number of guides as disclosed herein, as required for the application. The guides, reels, and other path components can be arranged in various configurations, subject to the teachings herein. Accordingly, the invention disclosed herein is to be limited only as specified in the following claims.

What is claimed is:

1. A guide for a flexible web comprising:
   a three dimensional body; and
   a web engaging surface on the body having a contour with a compound radius of curvature along a web travel direction and a convex contour orthogonal to the web travel direction.

2. A tape drive comprising:
   a first rotatable reel;
   means for mounting a tape cartridge, the tape cartridge including:
   a second rotatable reel; and
   a flexible tape having a first end and a second end, the second end wound upon the second reel;
   a guide in close proximity to the tape when the tape cartridge is mounted in the tape drive, the guide including a tape engaging surface having a longitudinal contour with a compound radius of curvature along a tape travel direction from the first reel to the second reel, the compound radius of curvature including a first portion and a second portion each have a relatively large radius of curvature, and a third portion having a relatively small radius of curvature between the first and the second portion, the first and second portions each including an arc of at least 6 degrees;
   means for extending the tape around the guide and winding the first end of the tape upon the first reel when the tape cartridge is mounted din the tape drive, the tape guided between the first reel and the second reel by the guide;

a transducing head mounted to be adjacent the tape when the tape cartridge is mounted in the tape drive;

means for controllably rotating the fist and second reels to advance the tape past the head, said means coupled to the first and second reels when the tape cartridge is mounted in the tape drive; and means coupled to the head for controllably operating the head to write to and/or read from the tape.

3. The tape drive of claim 2 wherein the radius of curvature of each of the first and second portions is at least 5 times the radius of curvature of the third portion.

4. The tape drive of claim 2 wherein the radius of curvature of the first portion is approximately the same as the radius of curvature of the second portion.

5. The guide of claim 2 wherein each of the first and second portions is joined to the third portion by a blending portion which provides a smoothly varying radius of curvature along the guide.

6. The guide of claim 5 wherein the blending portion is described by $$\frac{1}{R(s)} = ks^x + \frac{1}{R1}$$

where s is the distance along the tape engaging surface, R(s) is the radius of curvature at any point along the tape engaging surface, $R_1$ is the radius of curvature in the first and second portions, $0.5 < X < 2$, and k is a constant.

7. The tape drive of claim 2 wherein the tape engaging surface has a convex contour orthogonal to the tape travel direction.

8. A path for a flexible web comprising:
a first rotatable reel and a second rotatable reel;
a flexible web having its first end wound upon the fires reel and its second end wound upon the second reel; and
a guide in close proximity to the web and including a web engaging surface having a contour with a compound radius of curvature along a web travel direction from the first reel to the second reel, the compound radius of curvature including a first portion and second portion each having a relatively large radius of curvature, and a third portion having a relatively small radius of curvature between the first and the second portion, the first and second portions each including an arc of at least 6 degrees.

9. The path of claim 8 wherein the radius of curvature of each of the first and second portions is at least 5 times the radius of curvature of the third portion.

10. The path of claim 8 wherein the radius of curvature of the first portion is approximately the same as the radius of curvature of the second portion.

11. The path of claim 8 wherein each of the first and second portions is joined to the third portion by a blending portion which provides a smoothly varying radius of curvature along the guide.

12. The guide of claim 11 wherein the blending portion is described by $$\frac{1}{R(s)} = ks^x + \frac{1}{R1}$$

where s is the distance along the web engaging surface, R(s) is the radius of curvature at any point along the web engaging surface, $R_1$ is the radius of curvature in the first and second portions, $0.5 < X < 2$, and k is a constant.

13. The path of claim 8 wherein the web engaging surface has a convex contour orthogonal to the web travel direction.

14. A recording tape path comprising:
a first rotatable reel and a second rotatable reel;
a flexible tape having its first end wound upon the first reel and its second end wound upon the second reel;
a first and a second guide each in close proximity to the tape and including a tape engaging surface having a contour with a compound radius of curvature along a tape travel direction from the first reel to the second reel, the compound radius of curvature of each of the first and second guides including a first portion and a second portion each having a relatively large radius of curvature, and a third portion having a relatively small radius of curvature between the first and the second portion, the first and second portions each including an arc of at least 6 degrees; and
a transducing head adjacent the tape between the first and the second guides in the tape travel direction.

15. The path of claim 14 wherein the radius of curvature of each of the first and second portions is at least 5 times the radius of curvature of the third portion.

16. The path of claim 14 wherein the radius of curvature of the first portion is approximately the same as the radius of curvature of the second portion.

17. The path of claim 14 wherein each of the first and second portions is joined to the third portion by a blending portion which provides a smoothly varying radius of curvature along the guide.

18. The guide of claim 17 wherein the blending portion is described by $$\frac{1}{R(s)} = ks^x + \frac{1}{R1}$$

where s is the distance along the tape engaging surface, R(s) is the radius of curvature at any point along the tape engaging surface, $R_1$ is the radius of curvature in the first and second portions, $0.5 < X < 2$, and k is a constant.

19. The path of claim 14 wherein each tape engaging surface has a convex contour orthogonal to the tape travel direction.

20. A tape drive comprising:
means for mounting a tape cartridge, the tape cartridge including:
a first and a second rotatable reel;
a flexible tape having its first end wound upon the first reel and its second end wound upon the second reel; and
a guide in close proximity to the tape and including a tape engaging surface having a longitudinal contour with a compound radius of curvature along a tape travel direction from the first reel to the second reel, the compound radius of curvature including a first portion and a second portion each having a relatively large radius of curvature, and a third portion having a relatively small radius of curvature between the first and the second portion, the first and second portions each including an arc of at least 6 degrees;

a transducing head mounted to be adjacent the tape when the tape cartridge is mounted in the tape drive;

means for controllably rotating the first and second reels to advance the tape past the head, said means coupled to the first and second reels when the tape cartridge is mounted in the tape drive; and means coupled to the head for controllably operating the head to write and/or read from the tape.

21. The tape drive of claim 20 wherein the radius of curvature of each of the first and second portions is at least 5 times the radius of curvature of the third portion.

22. The tape drive of claim 20 wherein the radius of curvature of the first portion is approximately the same as the radius of curvature of the second portion.

23. The guide of claim 20 wherein each of the first and second portions is joined to the third portion by a blending portion which provides a smoothly varying radius of curvature along the guide.

24. The guide of claim 23 wherein the blending portion is described by $$\frac{1}{R(s)} = ks^x + \frac{1}{R1}$$

where s is the distance along the tape engaging surface, $R(s)$ is the radius of curvature at any point along the tape engaging surface, $R_1$ is the radius of curvature in the first and second portions, $0.5 < X < 2$, ; and k is a constant.

25. The tape drive of claim 20 wherein the tape engaging surface has a convex contour orthogonal to the tape travel direction.

* * * * *

UNITED STATES PATENT AND TRADEMARK OFFICE
CERTIFICATE OF CORRECTION

PATENT NO. :   5,282,105
DATED      :   January 25, 1994
INVENTOR(S) :  James H. Eaton, et al.

It is certified that error appears in the above-identified patent and that said Letters Patent is hereby corrected as shown below:

At column 7, line 37, the word "fires" should be --first--.

Signed and Sealed this

Twenty-eighth Day of June, 1994

Attest:

BRUCE LEHMAN

Attesting Officer    Commissioner of Patents and Trademarks